United States Patent
Vargo et al.

(10) Patent No.: US 6,330,024 B1
(45) Date of Patent: Dec. 11, 2001

(54) SYSTEM AND METHOD FOR CONTROLLING THE SIZE OF MATERIAL BANKS IN CALENDERS, MILLS, AND FEED MILLS

(75) Inventors: Richard David Vargo, Stow; Harlan William Frerking, Jr., Hartville, both of OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/194,934

(22) PCT Filed: Sep. 5, 1996

(86) PCT No.: PCT/US96/14260

§ 371 Date: Dec. 4, 1998

§ 102(e) Date: Dec. 4, 1998

(87) PCT Pub. No.: WO98/09789

PCT Pub. Date: Mar. 12, 1998

(51) Int. Cl.$^7$ .................................................. H04N 7/18
(52) U.S. Cl. .............................................. 348/86; 348/135
(58) Field of Search ..................... 162/198, 252, 162/253, 263; 242/534, 563; 264/40.1, 175; 348/86, 88, 91, 92, 135; 356/237.2, 429–431, 630; 382/141, 162; 425/141, 145, 148, 149; 700/117, 148, 150; H04N 7/18

(56) References Cited

U.S. PATENT DOCUMENTS

| | | | |
|---|---|---|---|
| 3,809,907 | 5/1974 | Schuller et al. | 250/219 |
| 3,898,024 | 8/1975 | Wockener | 425/145 |
| 3,930,922 | 1/1976 | Donoghue et al. | 156/243 |
| 4,110,387 | 8/1978 | Wöckener et al. | 264/40.5 |
| 4,214,857 * | 7/1980 | Woeckener et al. | 425/145 |
| 4,642,686 | 2/1987 | Nagano et al. | 358/107 |
| 5,262,101 | 11/1993 | Yagi et al. | 264/40.1 |
| 5,295,803 | 3/1994 | Ogawa et al. | 425/141 |
| 5,456,871 * | 10/1995 | Harada et al. | 264/40.1 |
| 5,760,891 * | 6/1998 | Graff | 356/237.2 |
| 5,769,353 * | 6/1998 | Juhe et al. | 242/563 |
| 5,959,737 * | 9/1999 | Kaminaga et al. | 356/630 |
| 6,231,722 * | 5/2001 | Vestola | 162/198 |

FOREIGN PATENT DOCUMENTS

| | | |
|---|---|---|
| 3231001 | 3/1984 | (DE) . |
| 2599912 | 5/1985 | (DE) . |
| 0061385 | 3/1982 | (EP) . |
| 645230A | 3/1995 | (EP) . |
| 52132072 | 11/1977 | (JP) . |
| 58006580 | 1/1983 | (JP) . |
| 58047924 | 3/1983 | (JP) . |
| 59132314 | 7/1984 | (JP) . |
| 59187832 | 10/1984 | (JP) . |
| 61224945 | 9/1986 | (JP) . |
| 61236317 | 10/1986 | (JP) . |
| 62071139 | 3/1987 | (JP) . |
| 6381011 | 4/1988 | (JP) . |
| 01325519 | 12/1989 | (JP) . |
| 05289354 | 11/1993 | (JP) . |
| 05289355 | 11/1993 | (JP) . |
| 920195281 | 2/1994 | (JP) ................................ B29C/3/24 |
| 06170875 | 6/1994 | (JP) . |

* cited by examiner

*Primary Examiner*—Richard Lee
(74) *Attorney, Agent, or Firm*—The Goodyear Tire & Rubber Company; Roger D. Emerson

(57) ABSTRACT

A quantity of material contained in a bank between a pair of calendering rolls is determined by digital imaging technology. Manipulation of digital images provided by a camera yields a light-hued image of material in the bank against a dark-hued background. The light-hued image is then divided into control zones associated with discrete regions of the bank fed by separate feed lines. Quantity and distribution of material in the bank can be controlled by adjusting feed rates based on information obtained through the digital images.

20 Claims, 2 Drawing Sheets

SYSTEM AND METHOD FOR CONTROLLING THE SIZE OF MATERIAL BANKS IN CALENDERS, MILLS, AND FEED MILLS

TECHNICAL FIELD

This invention pertains to the art of methods and apparatuses for measuring the quantity of material in a calender bank, and more specifically to methods and apparatuses for using digital imaging technology in a system for measuring and controlling the size and shape of a rolling calender bank. While the invention will be described in terms of processing an elastomeric material, the invention is also applicable to other materials such as pizza dough, plastics, paper pulp, or any material in which a bank is formed on a mill, calender or similar machine.

BACKGROUND ART

The size and shape of the rolling bank on a calender or mill is an important component in the calendering process. The bank provides a buffer to keep a uniform supply of material to the calender rolls. However, if the bank is not maintained at proper level, nonuniformities can appear in the calendered sheet. For example, if the bank is too low, voids can be formed in the sheet due to the "starved" condition of the bank. On the other hand, if the bank is too large, problems such as material scorching can occur, which produces cured or otherwise undesirable lumps in the sheet of material. In addition, variation in rolling bank size causes variation in the spreading force on the rolls resulting in uneven gauge of the sheet.

The ability to accurately control the size of the calender bank provides more uniform results in the calendered sheet in terms of component dimensions and composition. Inherent in the problem of controlling the bank size is the problem of being able to accurately measure the quantity and distribution of material present in the bank.

In the art, there have been a variety of methods and apparatuses employed in attempts to solve the problems associated with determining the bank size. For example, a method disclosed in U.S. Pat. No. 4,642,686 to Nagono et al. utilizes a video camera, a screen, and a light source to obtain a silhouette of the banked material. The area of the silhouette is then related to a quantity of material. The method involves a backlighting arrangement which is more complex than the inventive method.

Japanese Document No. 59-132314 to Yonezawa et al. discloses a method by which a television camera records a picture of a pair of blank rolls and then records a picture of the rolls having a bank of rubber therebetween. The difference between the pictures is obtained by a subtractor. The picture elements are then converted to black and white binary signals wherein the rubber is indicated in black. A correction means converts black portions which are below a predetermined width to white. This direct method of obtaining binary signals does not compensate for the problem of glare commonly encountered when shiny calendering rolls are employed.

European patent application 0 645 230 A1 to Hatanaka is also directed to a device for adjusting the quantity of a bank of material on a mill.

The present invention provides new and improved means for measuring and controlling the quantity of elastomeric material formed in a bank between two calendering rolls in a way which simply and effectively overcomes the problems currently encountered in the art.

DISCLOSURE OF INVENTION

In accordance with the practice of the present invention, there is provided a method for measuring the quantity of elastomeric material formed in a bank between two calendering rolls.

More particularly, in accordance with the present invention, a method utilizing digital images obtained by camera means trained on the calendering rolls is provided.

In accordance with one aspect of the invention, the method utilizes initial and secondary digital images comprising pixels having numerical values relating to lighter and darker hues. The initial image is obtained when the elastomeric material is absent and the secondary image is obtained when said elastomeric material is present. The inventive method is characterized by the steps of:

combining the initial and secondary images to form a third digital image wherein the elastomeric material is indicated by lighter hues;

excluding a portion of the third image which corresponds to the presence of the elastomeric material on a surface of the second roll;

measuring an area of lighter hues; and, relating the area to the quantity of elastomeric material in the bank.

In accordance with another aspect of the invention, the third digital image is optionally multiplied by an integer constant to increase a contrast between lighter and darker hues.

In accordance with another aspect of the invention, the numerical values of each of the pixels of the third digital image are compared to a predetermined standard, and values above the standard are converted to pure white hues, and values below the standard are converted to pure black hues.

In accordance with another aspect of the invention, the third digital image is corrected for perspective and lens distortion.

In accordance with another aspect of the invention, the number of pixels corresponding to the lighter hues are compared with a total number of pixels in the third digital image to obtain a fraction of the image corresponding to the elastomeric material. A calibration matrix is then utilized to convert the fraction to an actual cross-sectional area of elastomeric material present in the bank.

In accordance with another aspect of the invention, a method for controlling the quantity of elastomeric material contained in a bank between calendering rolls in a calendering apparatus is provided. The method utilizes initial and secondary digital images comprising pixels having numerical values relating to lighter and darker hues. The initial image is obtained when the elastomeric material is absent and the secondary image is obtained when the elastomeric material is present. The inventive method is characterized by the steps of:

combining the initial and secondary images to form a third digital image wherein the elastomeric material is indicated by lighter hues;

excluding a portion of the third image which corresponds to the presence of the elastomeric material on a surface of the second roll;

measuring an area of lighter hues;

relating the area to a total quantity of the elastomeric material in the bank;

comparing the total quantity of the elastomeric material in the bank with a predetermined optimal quantity; and, adjusting a feed rate of the elastomeric material to the calendering apparatus.

In accordance with another aspect of the invention, the elastomeric material is fed to the bank through a plurality of feed lines. In addition, the third digital image is divided into a plurality of zones, each zone corresponding to a region of the bank being fed by one of the feed lines. The quantity of elastomeric material contained in each of the regions is determined and compared to the total quantity of elastomeric material in the bank. The quantity of elastomeric material in each region is further be compared to the optimal quantity of elastomeric material in the bank.

In accordance with another aspect of the invention, the distribution of elastomeric material through each feed line is altered to optimize the quantity of elastomeric material in each region of the bank.

In accordance with another aspect of the invention, a system for determining the quantity of elastomeric material contained in a bank between first and second closely juxtaposed calendering rolls in a calendering apparatus is provided. The system utilizes initial and secondary digital images obtained by camera means trained on said rolls. The inventive system is characterized by:

combining means for combining the initial and secondary images to form a third digital image wherein the elastomeric material is indicated by lighter hues;

excluding means for excluding a portion of the third image which corresponds to the presence of the elastomeric material on a surface of the second roll;

measuring means for measuring an area of lighter hues; and converting means for converting the area to the quantity of elastomeric material in the bank.

In accordance with another aspect of the invention, the system includes contrasting means for increasing the contrast between the lighter and darker hues of the third image.

In accordance with another aspect of the invention, the system further includes correction means for correcting the third digital image for perspective and lens distortion.

One advantage of the present invention is overcoming the problem of imaging of shiny, highly reflective calender rolls.

Another advantage of the present invention is being able to exclude any elastomeric material covering a portion of the second roll.

Another advantage of the present invention is the ability to control the amount of elastomeric material contained in each region of the bank.

Still other benefits and advantages of the invention will become apparent to those skilled in the art to which it pertains upon a reading and understanding of the following detailed specification.

BRIEF DESCRIPTION OF DRAWINGS

The invention may take physical form in certain parts and arrangement of parts, a preferred embodiment of which will be described in detail in this specification and illustrated in the accompanying drawings which form a part hereof and wherein.

DETAILED DESCRIPTION OF THE INVENTION

Figure 1:
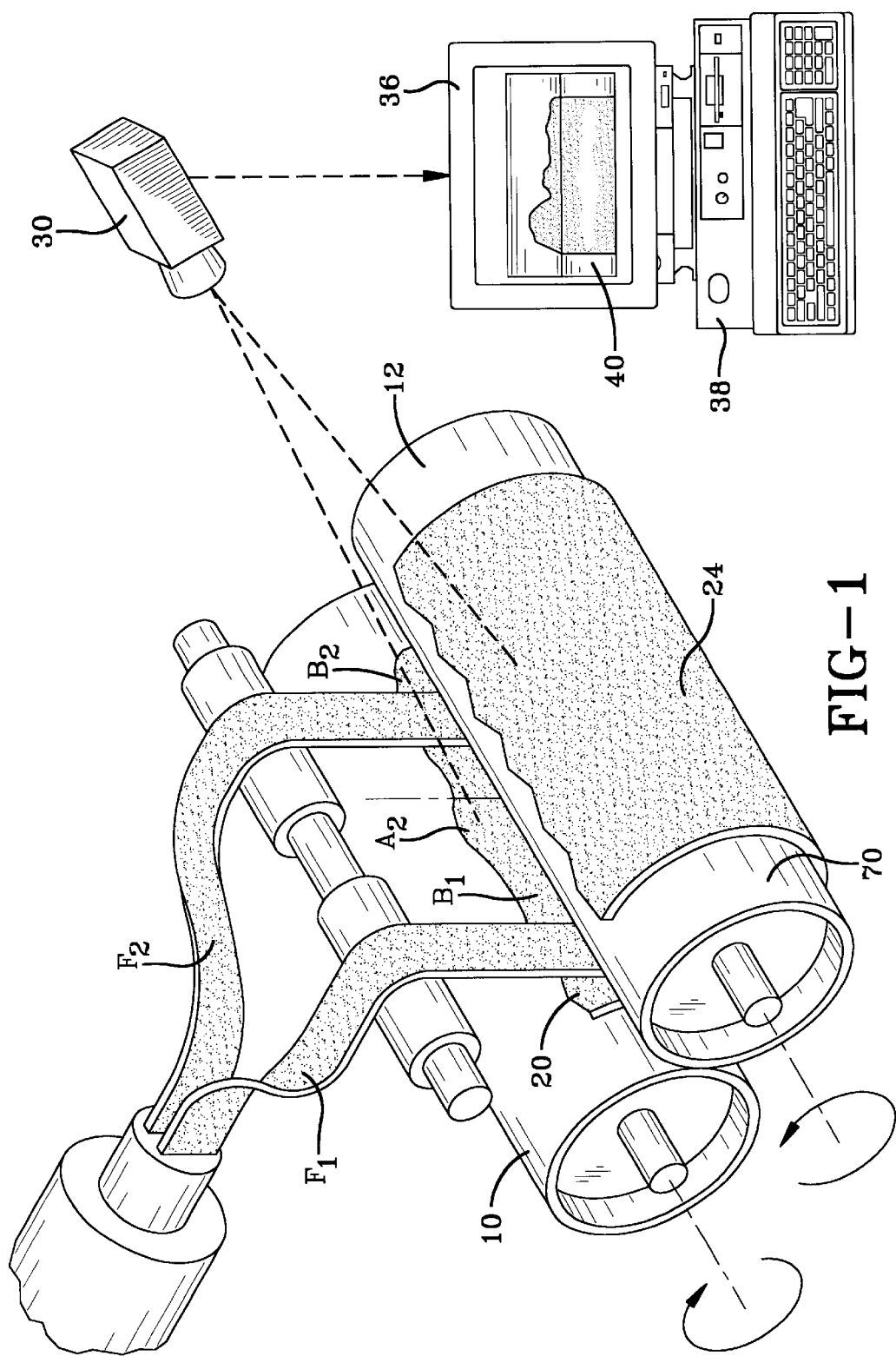
FIG. 1 is a perspective view of camera means trained on a bank of elastomeric material between a pair of calendering rolls; and, FIG. 2 is a schematic representation of a system for measuring and controlling the quantity of elastomeric material in a bank according to the present invention.

Referring now to the drawings wherein the showings are for purposes of illustrating a preferred embodiment of the invention only and not for purposes of limiting the same, FIG. 1 shows first and second calendering rolls 10, 12 respectively and a bank 20 of elastomeric material 24 contained therebetween. While the preferred embodiment of the present invention will be described with particular reference to a pair of calendering rolls in a calendering apparatus, the invention is equally applicable to mills and feed mills to hot feed extruders (not shown). Further, while the invention will be described with reference to elastomeric materials and with reference to the rubber processing industry and with reference to specifically tire components made of such processed rubber, the invention has wider applicability. For example, any material which is processed on a mill by creating and maintaining a bank is a candidate for the invention. For example, in the food industry where dough, such as pizza dough, is; processed in large quantities on mills, the problems inherent in maintaining bank size are also solvable by the invention. Throughout this application, the invention is described with reference to elastomeric material which is nearly always darker than the rolls. However, some materials, such as pizza dough, will actually have a hue which is lighter than the hue of the, rolls. The important issue is that the hue of the material be contrasted (lighter or darker) than the hue of the rolls after the combining means.

Camera means 30 trained on rolls 10, 12 obtains images of the rolls 10, 12 and any elastomeric material 24 present. The images may be observed on monitoring means 36 and stored in computing means, such as a computer 38. Digital imaging technology allows image manipulation functions on the digital images 40 to elicit data concerning the quantity and distribution of elastomeric material 24.

Figure 2:
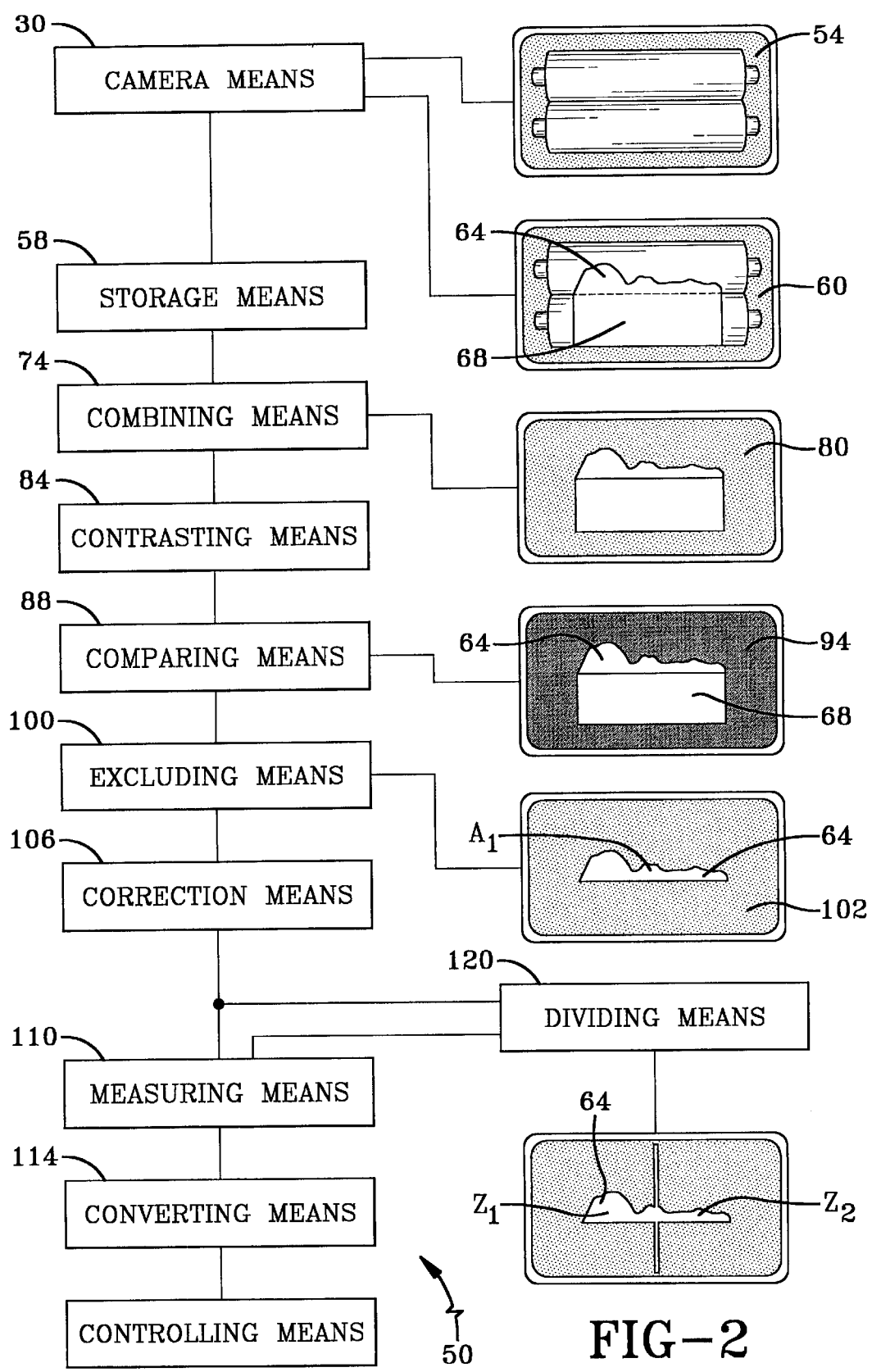

With reference to FIGS. 1 and 2, a system 50 for determining the quantity of elastomeric material 24 contained in a bank 20 between calendering rolls 10, 12 will be described. FIG. 2 also includes typical outputs which may be observed on monitoring means 36 as digital imaging technology is employed to manipulate the images 40 collected by camera means 30.

The system 50 for determining the quantity of elastomeric material 24 contained in a bank begins by initializing the computer 38 and camera means 30 in preparation for image collection and manipulation. An initial image 54 of the bare calender rolls 10, 12 is acquired by camera means 30 and stored in storing means 58 for use as a baseline reference to which all subsequent images are compared.

A secondary image 60 is obtained when elastomeric material 24 is present. The camera means 30 is positioned so that the secondary image 60 includes a profile 64 of the bank 20 against first calender roll 10. The secondary image 60 may also includes a profile 68 of elastomeric material 24 which is contained on a surface 70 of second roll 12 which commonly occurs in a calendaring operation. The secondary image 60 is then stored in the storing means 58 for future operations.

The system 50 employs combining means 74 for digitally combining the initial and secondary images 54, 60. The output from the combining means 74 yields a third digital image (80 wherein the elastomeric material 24 is indicated by lighter hues and the background and calender rolls 10, 12 are indicated by in darker hues. An important aspect of the invention is the "negative" of the elastomeric material 24 contained in the third digital image 80. The initial and secondary images 54, 60 are combined (subtracted) in such a way as to eliminate the problems often encountered in the art associated with the glare produced by shiny highly reflective calender rolls.

The inventive system can optionally further employ contrasting means 84 whereby the lighter hues are effectively brightened to provide a greater contrast between lighter and darker hues. The preferred contrasting means 84 multiplies the numerical value of each pixel of the third digital image 80 by an integer factor.

One embodiment of the inventive system 50 includes comparing means 88 for comparing the numerical values of each pixel of the third digital image 80 to a predetermined standard and converting values above the standard to pure white hues and converting values below the standard to pure black hues. Therefore an image 94 having only pure white and pure black hues is obtained.

The system 50 further includes excluding means 100 whereby the profile 68 of the elastomeric material 24 on the second calender roll 12 is excluded. Only the profile 64 of the bank 20 remains as lighter hues in an image 102.

One embodiment of the inventive system 50 includes correction means 106 for correcting the profile 64 in image 102 for lens and perspective distortions. The image correction is performed from the middle of the image 102 outward in both horizontal and vertical directions.

Measuring means 110 are employed to obtain a cross-sectional area, $A_1$, of the profile 64 of the bank 20 in terms of the number of white pixels in the image 102.

Converting means 114 can then convert the measured area $A_1$ into a real cross-sectional area $A_2$ of the bank 20 by use of a calibration matrix. Real cross-sectional area $A_2$ can then be related to the quantity of elastomeric material 24 in the bank 20. One means for relating the real cross-sectional area $A_2$ to quantity of elastomeric material 24 in bank 20 utilizes volume of revolution methods.

A preferred embodiment of the inventive system 50 further includes dividing means 120 for dividing the profile 64 of bank 20 into control zones $Z_n$ corresponding to discrete regions $B_n$ of the bank 20 being fed by separate feed lines $F_n$. For the sake of simplicity, two control zones $Z_1$, $Z_2$ are shown in FIG. 2 which correspond to regions $B_1$, $B_2$ respectively, which are fed by feed lines $F_1$, $F_2$, respectively, as shown in FIG. 1. It is readily apparent, however, that finer control of the quantity of elastomeric material 24 in bank 20 may be obtained through the use of a greater number of control zones $Z_1$.

The quantity of elastomeric material 24 contained in the bank 20, or in each discrete region $B_n$, can then be controlled by adjusting the overall rate at which elastomeric material 24 is fed to the calendering apparatus or by controlling the rate at which elastomeric material 24. is fed through each discrete feed line $F_n$.

A method for measuring and controlling the quantity of elastomeric material 24 contained in a bank 20 between first and second calendering rolls 10, 12 will be described with reference to FIGS. 1 and 2. Camera means 30 trained on first and second closely juxtaposed calendering rolls 10, 12 records an initial digital image 54 of the rolls 10, 12. Elastomeric material 24 is fed to the calendering rolls 10, 12 and a secondary digital image 60 is taken of the rolls 10, 12 including elastomeric material 24 contained in a bank 20 therebetween. The digital images 54, 60 comprise pixels (picture elements) having numerical values relating to lighter and darker hues. In the inventive method, the initial image 54 and secondary image 60 are combined to form a third digital image 80 wherein the elastomeric material is indicated by lighter hues. In the combining step, the calendering rolls 10, 12 are included in the background and indicated by darker hues. The profile 68 of the elastomeric material 24 on the surface 70) of the second roll 12 is excluded from the third image 80 by converting it to darker hues. The area $A_1$ of profile 64 of bank 20 indicated by lighter hues can then be measured in terms of the number of pixels and converted to a real cross-sectional area $A_2$ of elastomeric material 24 is the bank 20. The cross-sectional area $A_2$ of the elastomeric material 24 in the bank 20 is then related to the quantity of elastomeric material 24. In a preferred method, the number of pixels corresponding to lighter hues is compared with a total number of pixels in the third digital image 80 to obtain a fraction of the image 80 corresponding to the elastomeric material 24. A calibration matrix converts the fraction into an actual cross-sectional area $A_2$.

In a preferred method, the contrast between lighter and darker hues in the third digital image 80 can be increased by multiplying the third digital image 80 by an integer constant.

Also, in a preferred method, the numerical values of each pixel of the third digital image 80 is compared to a predetermined standard. Values above the standard (lighter hues) are converted to pure white while values below the standard (darker hues) are converted to pure black. In this way, the contrast between lighter hues and darker hues is maximized and the background is eliminated from later manipulations.

In a preferred method, corrections for perspective and lens distortion are made to provide accurate information about the elastomeric material 24 in the bank 20.

A preferred method for determining the quantity of elastomeric material 24 in a bank 20 further comprises dividing the profile 64 of bank 20 into a plurality of control zones $Z_n$.

In a preferred method of controlling the quantity of elastomeric material 24 in the bank 20, each of the control zones $Z_n$. are associated with a discrete region $B_n$, of the bank 20 which is fed by a separate feed line $F_n$. The information regarding the area of each control zone $Z_n$ is related to quantity of elastomeric material 24 in each region $B_n$ and can be adjusted to obtain optimum feed rates and distribution.

The preferred embodiments have been described, hereinabove. It will be apparent to those skilled in the art that the above methods may incorporate changes and modifications without departing from the general scope of this invention. It is intended to include all such modifications and alterations in so far as they come within the scope of the appended claims or the equivalents thereof.

Having thus described the invention, it is now claimed:

1. A method for measuring a quantity of material contained in a bank between first and second closely juxtaposed calendering rolls in a calendaring apparatus utilizing initial and secondary digital images comprising pixels having numerical values relating to lighter and darker hues, said digital images being obtained by camera means trained on said rolls, said initial digital image being obtained when said material is absent and said secondary digital image being obtained when said material is present, the method being characterized by the steps of:

combining said initial and secondary digital images to form a third digital image wherein said material is indicated by lighter hues;

excluding a portion of said third image which corresponds to the presence of said material on a surface of said second roll;

measuring an area of lighter hues; and, relating said area to said quantity of said material in said bank.

2. The method of claim 1 further comprising the step of:
multiplying said third digital image by an integer constant to increase a contrast between lighter and darker hues.

3. The method of claim 1 further comprising the step of:
comparing said numerical values of pixels of said third digital image to a predetermined standard and converting values above said standard to pure white hues and converting values below said standard to pure black hues.

4. The method of claim 1 further comprising the step of:
correcting said third digital image for perspective distortion; and,
correcting said third digital image for lens distortion.

5. The method of claim 1 wherein said step of combining said initial and secondary digital images comprises:
digitally subtracting said secondary digital image from said initial digital image.

6. The method of claim 1 wherein said step of measuring an area of lighter hues comprises:
recording a number of pixels corresponding to said lighter hues.

7. The method of claim 6 wherein said step of relating said area to said quantity of said material comprises:
comparing said number of pixels corresponding to said lighter hues with a total number of pixels in said third digital image to obtain a fraction of an image corresponding to said material; and,
utilizing a calibration matrix to convert said fraction into an actual cross-sectional area.

8. The method of claim 1 further comprising the step of:
dividing said third digital image into a plurality of zones.

9. The method of claim 1 further characterized by the steps of:
comparing a total quantity of said material in said bank with a predetermined optimal quantity; and
adjusting a feed rate of said material to said calendering apparatus.

10. The method of claim 9 further comprising the steps of:
feeding said material to said bank through a plurality of feed lines;
dividing said third digital image into a plurality of zones, each of said zones corresponding to a region of said bank being fed by one of said feed lines;
determining a quantity of said material contained in each of regions of said bank; and,
comparing said quantity of said material in each of said regions of said bank with said total quantity of material in said bank.

11. The method of claim 10 further comprising the step of:
comparing said quantity of said material in each of said regions with said optimal quantity of material in said bank.

12. The method of claim 11 further comprising the step of:
distributing the material provided through said feed lines.

13. The method of claim 9 wherein said material is elastomeric.

14. The method of claim 1 wherein said material is elastomeric.

15. The method of claim 1 wherein said method is practiced on a mill.

16. A system for determining a quantity of material contained in a bank between first and second closely juxtaposed calendering rolls in a calendering apparatus utilizing initial and secondary digital images comprising pixels having numerical values relating to lighter and darker hues, said digital images being obtained by camera means trained on said rolls, said initial digital image being obtained when said material is absent and said secondary digital image being obtained when said material is present, the system being characterized by:
combining means for combining said initial and secondary digital images to form a third digital image wherein said material is indicated by lighter hues;
excluding means for excluding a portion of said third digital image which corresponds to the presence of said material on a surface of said second roll;
measuring means for measuring an area of lighter hues; and,
converting means for converting said area to said quantity of said material in said bank.

17. The system of claim 16 further comprising:
contrasting means for increasing a contrast between said lighter and darker hues of said third digital image.

18. The system of claim 17 further comprising:
comparing means for comparing said numerical values of pixels of said third digital image to a predetermined standard and converting values above said standard to pure white hues and converting values below said standard to pure black hues.

19. The system of claim 16 further comprising:
correction means for correcting said third digital image for perspective and lens distortion.

20. The system of claim 16 wherein said material is elastomeric.

* * * * *